United States Patent [19]
Carroll et al.

[11] Patent Number: 6,121,960
[45] Date of Patent: Sep. 19, 2000

[54] TOUCH SCREEN SYSTEMS AND METHODS

[75] Inventors: David W. Carroll; James L. Carroll; Steven V. Case, all of Northfield, Minn.

[73] Assignee: ViA, Inc., Burnsville, Minn.

[21] Appl. No.: 08/919,527

[22] Filed: Aug. 28, 1997

Related U.S. Application Data

[60] Provisional application No. 60/024,780, Aug. 28, 1996, provisional application No. 60/028,028, Oct. 9, 1996, and provisional application No. 60/036,195, Jan. 21, 1997.

[51] Int. Cl.[7] .................................................. G09G 5/00
[52] U.S. Cl. ........................... 345/173; 345/172; 345/169
[58] Field of Search ..................................... 345/173, 172, 345/168, 169, 429, 113; 361/683

[56] References Cited

U.S. PATENT DOCUMENTS

| | | |
|---|---|---|
| 4,725,694 | 2/1988 | Auer et al. . |
| 4,763,356 | 8/1988 | Day, Jr. et al. . |
| 4,827,253 | 5/1989 | Maltz . |
| 4,954,970 | 9/1990 | Walker et al. . |
| 5,031,119 | 7/1991 | Dulaney et al. . |
| 5,283,560 | 2/1994 | Bartlett ..................................... 345/113 |
| 5,379,057 | 1/1995 | Clough et al. . |
| 5,491,495 | 2/1996 | Ward et al. . |
| 5,523,775 | 6/1996 | Capps . |
| 5,539,429 | 7/1996 | Yano et al. . |
| 5,581,243 | 12/1996 | Ouellette et al. . |
| 5,606,345 | 2/1997 | Truchet . |
| 5,612,719 | 3/1997 | Beernink et al. . |
| 5,615,384 | 3/1997 | Allard et al. . |
| 5,627,567 | 5/1997 | Davidson . |
| 5,675,362 | 10/1997 | Clough . |
| 5,798,907 | 8/1998 | Janik ...................................... 361/683 |
| 5,870,100 | 2/1999 | DeFreitas ................................ 345/429 |

FOREIGN PATENT DOCUMENTS 2-155029  6/1990  Japan .

*Primary Examiner*—Steven J. Saras
*Assistant Examiner*—Alecia D. Nelson
*Attorney, Agent, or Firm*—Patterson, Thuente & Skaar, P.A.

[57] ABSTRACT

A screen peripheral system according to an embodiment of the invention includes a computing device for producing a main image and a touch-activated input device for generating and displaying a composite image visible to a user. The composite image simultaneously includes a representation of at least one key, for example a QWERTY keyboard, for activating an input function, and the main image provided by the computing device. The keyboard representation preferably is laid over the main image. According to one embodiment, the main image is an output image generated by an application being executed by the computing device. Other touch screen systems and methods are also disclosed.

30 Claims, 9 Drawing Sheets

FIG. 11
FIG. 12
FIG. 13
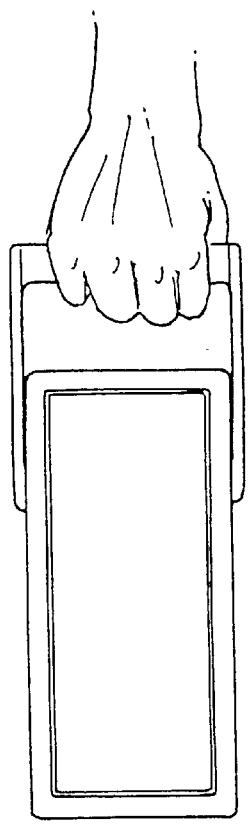
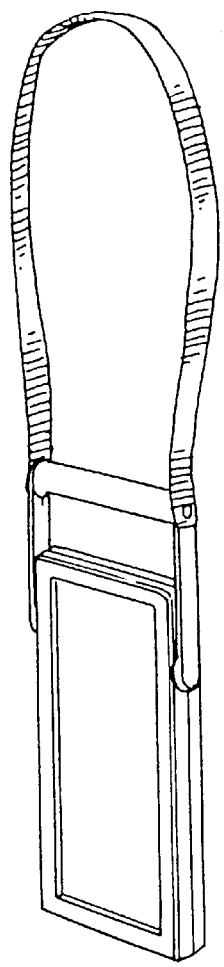
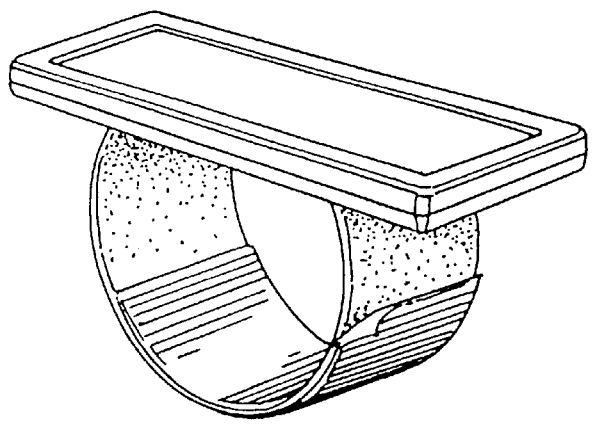

TOUCH SCREEN SYSTEMS AND METHODS

CROSS-REFERENCE TO RELATED APPLICATIONS

The subject matter of this application is related to the subject matter of commonly assigned U.S. Provisional Applications Ser. No. 60/024,780, filed Aug. 28, 1996, Ser. No. 60/028,028, filed Oct. 9, 1996, and Ser. No. 60/036,195, filed Jan. 21, 1997, all of which provisional applications are incorporated by reference herein and priority to which is claimed under 35 U.S.C. §119(e).

BACKGROUND OF THE INVENTION

1. Field of the Invention

The invention relates to touch-sensitive input and output devices, and more particularly, to touch screens that simultaneously can display a keyboard-type image superimposed on a background image. The invention also relates to other features of touch-sensitive i/o devices. Embodiments of the invention have particular application to wearable-computing devices and environments, although non-wearable embodiments are also contemplated.

2. Description of Related Art

It is known in the art to superimpose a keyboard over an image that is output by an application being executed on a computer, i.e. to form a "phantom" keyboard, on a touch-sensitive input display device. U.S. Pat. No. 5,581,243 to Ouellette et al., for example, which is incorporated by reference herein in its entirety, describes a system for displaying a simulated keyboard on a touch-sensitive display, without occluding from view an underlying application output image. An output image is generated and displayed for a first period of time at a first luminous radiation intensity having a predetermined persistence. A simulated keyboard image is generated and displayed for a second, shorter period of time at a second, lower luminous radiation intensity having the predetermined persistence. The keyboard and output images are generated in alternation, and the amount of time each is displayed is controlled, to try to create the illusion that both images are being displayed continuously.

The system described in Ouellette et al., however, is believed to suffer a number of disadvantages. First, it is believed that flashing between application and keyboard screens, as the reference discloses, would significantly reduce the refresh rate achievable relative to a continuously displayed application output (or a keyboard) image. This reduction could cause considerable detriment to the viewer and potentially could confuse the displayed interpretive features. Second, it is believed that displaying the keyboard and the application output in alternation requires additional hardware features for proper functioning, for example a second frame buffer for switching back and forth between the screens. Additionally, although this feature is not disclosed or apparently contemplated in Ouellette, using the Ouellette device in a wireless-transmission (e.g. RF) environment, for example in a wearable-computing context, would require e.g. twice as much information to wirelessly be transmitted and therefore would greatly increase the required bandwidth.

SUMMARY OF THE INVENTION

To overcome the above and other disadvantages, a screen peripheral system according to an embodiment of the invention includes a computing device for producing a main image and a touch-activated input device for generating and displaying a composite image visible to a user. The composite image simultaneously includes a representation of at least one key, for example a QWERTY keyboard, for activating an input function, and the main image provided by the computing device. The keyboard representation preferably is laid over the main image.

The system implements variable-pixel control to form the keyboard representation and to form the main image, causing the pixels selected to form the keyboard representation and selected to form the main image to be dependent on each other. In other words, the keyboard-representation pixels are not independent of the main-image pixels. According to one embodiment, the main image is an output image generated by an application being executed by the computing device.

Various image-adjustment, mode-switching, zoom-up/zoom-down and other embodiments associated with invention are also described, as are corresponding methods.

Embodiments of the invention have particular application to wearable computing devices, such as those available from ViA, Inc., Northfield, Minn. Attention also is directed to the following U.S. patents, each of which is incorporated by reference herein: U.S. Pat. Nos. 5,581,492; 5,572,401; 5,555,490; 5,491,651 and 5,285,398, all of which are owned by ViA, Inc.

BRIEF DESCRIPTION OF THE DRAWINGS

Embodiments of the invention will be described with respect to the figures, in which like reference numerals denote like elements, and in which:

FIGS. 9–13 show touch screens having a handle, according to embodiments of the invention.

DETAILED DESCRIPTION OF PREFERRED EMBODIMENTS

Figure 1:
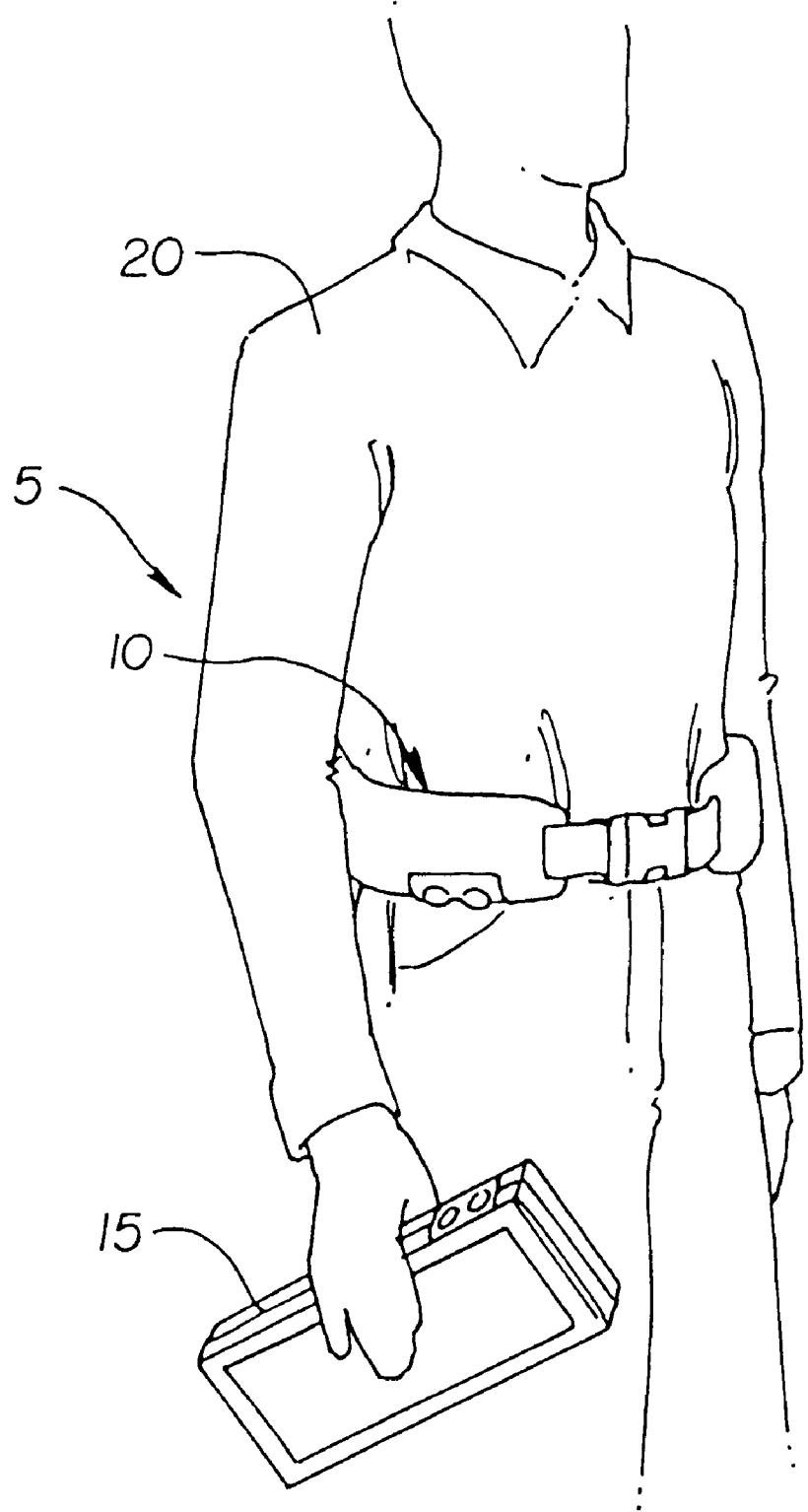
FIG. 1 is a perspective view of a wearable computing environment according to an embodiment of the invention.

Embodiments of the invention have wide application in a number of computing environments. The invention is particularly applicable to wearable computing environments, as discussed above, in which portability and compactness are fundamental considerations. The invention is also applicable to a number of different input/output devices. For example, embodiments of the invention contemplate i/o devices with full, partial, reduced-key, alphanumeric or non-alphanumeric keyboards comprising one or more "keys," "buttons," "contact zones" or the like. The invention also contemplates a number of input schemes in which a user manually or audibly directs certain keys to be activated, not just screens requiring direct manual contact with e.g. a user's finger. Proximity-based, pen-based and voice-based inputs are among the functionalities encompassed by embodiments of the invention. In fact, any display with any "pointing" device, i.e. a device that designates a particular point or zone on the display, is contemplated for use with embodiments of the invention. Therefore, although particular embodiments will be described with respect to touch screens, keyboards and touch input, the invention is intended to be broadly interpreted as needed and not necessarily limited to those particular embodiments.

Additionally, various images can be combined/superimposed according to embodiments of the invention. In primary embodiments, the superimposed image is that of at least one key, e.g. a keyboard. The background image is that output by an application executed by a computing device, for example a graphics, spreadsheet, word-processing, etc. application for use in private, commercial, military, public-service fields or other fields. However, either the background image or the superimposed image can be of other types; for example the background image, or both images, can be provided by a processor or storage device associated with the system, instead of by an application program per se. Either or both image can be the subject of an enlargement or reduction process, to provide composite images having elements of different sizes. More than two images can be combined according to the invention as well; any combination of application, keyboard, or other images can be combined in a composite image. Therefore, although particular embodiments will be described herein with reference to application-output images, keyboards, etc., the invention is intended to be broadly interpreted as needed and not necessarily limited to those particular embodiments.

Touch screen keyboard overlays according to embodiments of the invention can be selectively turned on and off by a user of an associated personal computing device, for example a wearable personal computer. A representation of a keyboard, as will be described, lies over a main image on the touch screen, the main image preferably being formed in connection with a main software application. A keyboard overlay according to the invention eliminates a physical keyboard or the necessity of having a split screen with a touch keyboard on a lower portion and a main screen squeezed into the remaining upper portion, for example. A keyboard overlay according to the invention also reduces and/or eliminates the space-conflict problems that can arise when a superimposed keyboard occupies the same portion of the display screen as a critical portion of the application output image.

Keyboard overlays according to the invention are especially advantageous for very small screens, because of the relatively large and accessible overlay "buttons" (keys) that are provided, along with the ability to see all of the data behind the keyboard at the same time.

Embodiments of the invention are especially advantageous in situations where voice-based input is undesirable. Although voice-recognition technology is making significant advances, it still requires verbal input, which can be disruptive to a meeting, for example. Verbal input also potentially announces to all within earshot of the speaker the exact notes, etc. that are being entered. According to embodiments of the invention, therefore, the user inputs directly to the machine in complete silence. Still, voice-based input may be desirable in many cases, so optional switching between voice input and keyboard-overlay input is also contemplated. This can be activated by a physical button or key on the side or other surface of the touchscreen or associated device, or by a virtual button or key on the touch-sensitive portion of the screen itself, or by voice.

Keyboard overlays according to embodiments of the invention can take a number of forms. For example, a solid-line or dashed/dotted-line overlay is contemplated, providing outlines of each key. Alternatively, and selectively as chosen by a user, each key can be represented by a dot, or as a letter-area zone between intervening markers such as x's, dots, etc. Ideally, the representation of the keyboard is provided faintly on the standard screen, so that it and data/images from the main program can be seen simultaneously. Variable-pixel controls, described in more detail below, can be provided to change the thickness, brightness, and/or dotted-ness of the keyboard representation. In many cases the keyboard overlay can be extremely faint. Additionally, a color difference can be imparted to the pixels of either the keyboard overlay or the underlying image, or both, to highlight the difference between the two.

The characters of the keyboard themselves, e.g. the letters associated with each key or zone, can be turned off if the user has memorized the keyboard layout, for example. The keyboard can be active without being visible at all, for the user who can type effectively without even seeing representations of the keys/zones themselves.

Contrast adjustment buttons are contemplated, preferably represented on the touch screen itself but possibly on a housing of the touch screen, to adjust contrast between the keyboard and the main screen. A keyboard on-off button is also contemplated. Alternatively, these features can be controlled by voice.

Variable-pixel controls

In accordance with embodiments of the invention, software-based variable-pixel controls are provided to determine and control which pixels of the touch screen will be used for displaying the keyboard representation and which pixels for displaying the main image. In some cases, each pixel of the screen is 100% dedicated to either the keyboard or the main image. In other cases, touch screen pixels may be dedicated to both the keyboard and the main image, producing a "blended" effect as will be described.

Merging the image of the virtual keyboard with the normal output image on the display according to the invention can occur by a variety of methods and programming schemes. Using most current video graphics controllers, however, it is believed a highly efficient method available to perform the merging of images is to use bit-block or bit-block-type transfer operations, i.e. BitBlt operations.

BitBlt operations provide an efficient method of performing logical combination of up to three sets of pixels on raster-based display devices. According to embodiments of the invention, BitBlt operations are used with the following three sets of pixels:

(1) The original pixels on the display, i.e. the image that would be presented in the absence of the virtual keyboard.

(2) The pixels representing the image of the virtual keyboard.

(3) An image mask, allowing control of which pixels within the virtual keyboard will be merged with the original display pixels.

Using BitBlt operations, the virtual keyboard can be combined with the display using a variety of effects. The following table summarizes the typical operations that can be performed:

| Source (S)<br>Destination (D)<br>Mask (M) | 1 1 0 0 1 1 0 0<br>1 0 1 0 1 0 1 0<br>1 1 1 1 0 0 0 0 | Boolean<br>Operation | Operation |
|---|---|---|---|
| Result | 0 0 0 0 0 0 0 0 | 0 | Blackness |
|  | 0 0 0 1 0 0 0 1 | ~(S\|D) | Not source erase |
|  | 0 0 1 1 0 0 1 1 | ~S | Not source copy |
|  | 0 1 0 0 0 1 0 0 | S & ~D | Source erase |
|  | 0 1 0 1 0 1 0 1 | ~D | Destination invert |
|  | 0 1 0 1 1 0 1 0 | M ^ D | Mask invert |
|  | 0 1 1 0 0 1 1 0 | S ^ D | Source invert |
|  | 1 0 0 0 1 0 0 0 | S & D | Source and |
|  | 1 0 1 1 1 0 1 1 | ~S\|D | Merge paint |
|  | 1 1 0 0 0 0 0 0 | M & S | Merge copy |
|  | 1 1 0 0 1 1 0 0 | S | Source copy |
|  | 1 1 1 0 1 1 1 0 | S\|D | Source paint |
|  | 1 1 1 1 0 0 0 0 | M | Mask copy |
|  | 1 1 1 1 1 0 1 1 | M\|~S\|D | Mask paint |
|  | 1 1 1 1 1 1 1 1 | 1 | Whiteness |

Additionally, those of skill in the art upon reading this disclosure will comprehend that similar logic functions can be applied to the color-differentiation capability described earlier; such functions are not limited to black/white/grey capabilities.

The logical operations described herein each preferably have a different blending or merging effect. Although some of them do not have substantive effect, e.g. they just copy the source in to the destination or just fill it with zeros or ones and are ignorant of what the source and destination have, the large majority of these operations can be used to create a number of different effects to determine how to mesh the keyboard image and the application output image together. Additionally, the various logical operations can be combined as needed to produce an even greater variety of visual effects, e.g. harshness/intensity of one image with respect to the other.

Two examples of the myriad of meshing possibilities contemplated according to the invention will now be described. In the first example, the keyboard is blended with the original display application-output image by using 25% of the pixels to represent the keyboard and 75% of the pixels to represent the original display image. In the second example, the two images are more truly blended together, with each pixel of the final composite display image receiving a contribution from both images. For the second example, the composite realized image can appear as e.g. a blended shadow from the original images. For both examples, it is assumed according to one embodiment that the graphics controller of the computer system is using an 8-bit bit plane, which is typical of most personal computers supporting 256 colors per pixel. Of course, those of ordinary skill will readily be able to adapt these examples for use in other current and future graphics controllers, bit planes, etc.

In the first example, where the keyboard is blended with the display by using 25% of the pixels to represent the keyboard and 75% of the pixels to represent the original display image, each display update preferably is performed in three steps. The first step removes that portion of the keyboard image that is not to be seen, i.e. it eliminates 75% of the keyboard image. The second step removes that portion of the main display image that is not to be seen, i.e. it eliminates 25% of the main display image. The third step merges these two images. The following pseudocode represents one embodiment of the associated processing used according to this example:

| reduced_kbd := BitBlt | (source | => keyboard image, |
|---|---|---|
|  | destination | => keyboard image, |
|  | mask | => [0xFF, 0x00, 0x00, 0x00,<br>0xFF, 0x00, 0x00, 0x00,<br>. . . ], |
|  | operation | => merge copy); |
| reduced_display := BitBlt | (source | => original display image, |
|  | destination | => original display image, |
|  | mask | => [0x00, 0xFF, 0xFF, 0xFF,<br>0x00, 0xFF, 0xFF, 0xFF,<br>. . . ], |
|  | operation | => merge copy); |
| display := BitBlt | (source | => reduced_kbd, |
|  | destination | => reduced_display, |
|  | mask | => null, |
|  | operation | => source paint); |

With the first example, for performance reasons the first BitBlt can be performed once at initialization and then stored for reuse in future display updates. Essentially, the process eliminates from the two images those pixels that are not desired for the single, final composite image that is displayed to the user. In this way, neither image contains overlapping pixels. In the combined image, therefore, each pixel is contributed 100% by either the keyboard or the display, but 0% from the alternate.

With the second example, the two images are logically combined using a single BitBlt, according to one embodiment. The following pseudocode represents one embodiment of the associated processing used according to this example:

| display := BitBlt | (source | => keyboard image, |
|---|---|---|
|  | destination | => original display image, |
|  | mask | => null, |
|  | operation | => source paint); |

Current embodiments of the invention employ the following assumptions for performance reasons. It is contemplated that embodiments of the invention are for typically available operating systems, ones that support multi-tasking, with each application having its own thread of control, and a graphical user interface using windows as the visual representation of each task. Examples of such operating systems are Microsoft Windows 95, Microsoft Windows NT, SCO Unix, and Sun's Solaris operating system. Embodiments of the invention are also for typical video graphics controllers, ones that support bit-block transfer (BitBlt) operations and DMA between processor memory and video memory. Graphics controllers from Chips and Technologies, S3, NeoMagic, Trident, and other companies all support these operations, for example.

Embodiments of the invention should be useable without necessarily relying on these assumptions, as hardware and software technologies evolve, for example (such as with multiprocessors used in one device, for example). Even currently, implementation in environments other than those described above is contemplated according to the invention, even though implementation in at least some of those environments may be more complex and subject to slower operation.

Thus, according to embodiments of the invention, and as shown in e.g. FIGS. 1–5, screen peripheral system 5 according to an embodiment of the invention includes computing device 10 for e.g. executing a software application, and touch-activated input device 15 for generating and displaying a composite image visible to a user 20 of screen peripheral system 5. The composite image includes, according to one embodiment, a representation of at least one key for activating an input function, e.g. a keyboard-input function. The composite image also includes a main display image, for example the output image produced by the software application being executed by computing device 10. The representation of at least one key is laid over the main image produced by the software application.

FIG. 1 shows screen peripheral system 5 in a wearable-computing environment, which as described earlier is especially well-suited to embodiments of the invention. Embodiments of the invention can also be used in connection with a miniature, low-power, spread-spectrum "bodyLAN"-type system allowing selective control based on proximity to a user. With such a system, touch-activated input device 15 can be in either wired or wireless communication with computing device 10 and/or other devices/systems, for example LANs, WANs, etc. Wired and wireless communication embodiments are also contemplated for use with non-wearable computing devices as well. Fiber optic, electrical, infrared, RF and other data-transmission schemes between e.g. the disclosed input device and the wearable or other computer, or between any other elements of the system, are contemplated. For example, RF transmission to keyboard or a wearable, desktop, laptop or other computer. Embodiments of the invention are especially useful with tablet-type touch screens and other small, readily portable/pocketable input/output devices.

Embodiments of the invention also can be used in connection with heads-up and/or body-worn display devices, e.g. dual-screen stereo displays. A keyboard overlay according to the invention, preferably a voice-activated and/or voice-controlled overlay, appears on the display, allowing the user to input data without looking down. Automatic typing features with voice-recognition can be provided, whereby the user sees individual keys of the keyboard being activated as the user speaks. Voice can thus be used as an intuitive keyboard approach for the spoken words/letters in a hands-free environment.

Screen peripheral system 5 implements variable-pixel control to form the representation of at least one key and to form the output image, for example in the manner described above. The variable-pixel control causes the pixels used to form the representation of at least one key and the pixels used to form the output image to be directly dependent on each other, in a manner that for example is also described above. In other words, unlike the Ouellette reference disclosed above, the pixels chosen to represent the images are not independent.

The variable-pixel control can provide contrast adjustment between the representation of at least one key and the output image produced by the software application. The contrast adjustment can include changing at least one of the thickness, brightness, color and dotted-ness of the representation of at least one key.

As referenced above, according to one example computing device 5 eliminates X% of the pixels of a full representation of at least one key, X% representing that portion of the keyboard that is not to be seen in the composite image. In the first example described above, X=75, although X can have a variety of different values to suit a particular display or purpose. Computing device 5 also eliminates (100-X)%, e.g. 25% as described above, of the pixels of a full application output image. Here, (100-X)% represents that portion of the application output image that is not to be seen in the composite image. Computing device 5 merges the pixel-eliminated key representation with the pixel-eliminated main image to form the composite image. Alternatively and/or additionally, as in the second example described above, the composite image can include a blended shadow of the representation of at least one key and the main image. Computing device 5 can control the lightness/darkness of the blended shadow by controlling the blending of pixels of the at least one key representation and the main image, according to one embodiment. By changing the darkness of the pixels of the composite image, for example the keyboard portion of the composite image, the keyboard can be made to appear to "bleed through" the other image. Thus, the keyboard "steals away" appropriate pixels from the main image, and/or shades them differently in a selected manner, to produce the keyboard image.

As will be appreciated by those of ordinary skill in the art upon reading this disclosure, methods corresponding to the above-described apparatus and systems are also contemplated according to the invention.

Figure 2:
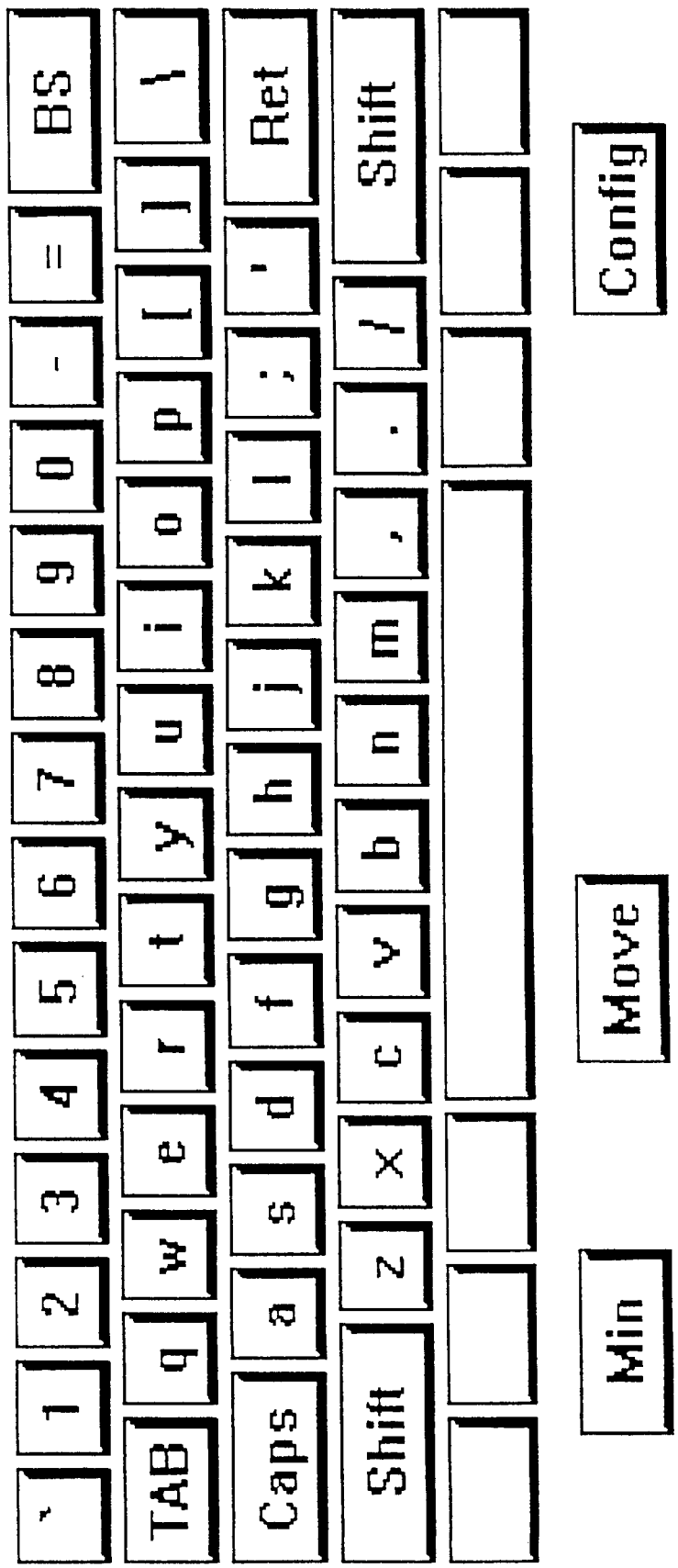
FIG. 2 shows a keyboard representation according to an embodiment of the invention.
Figure 3:
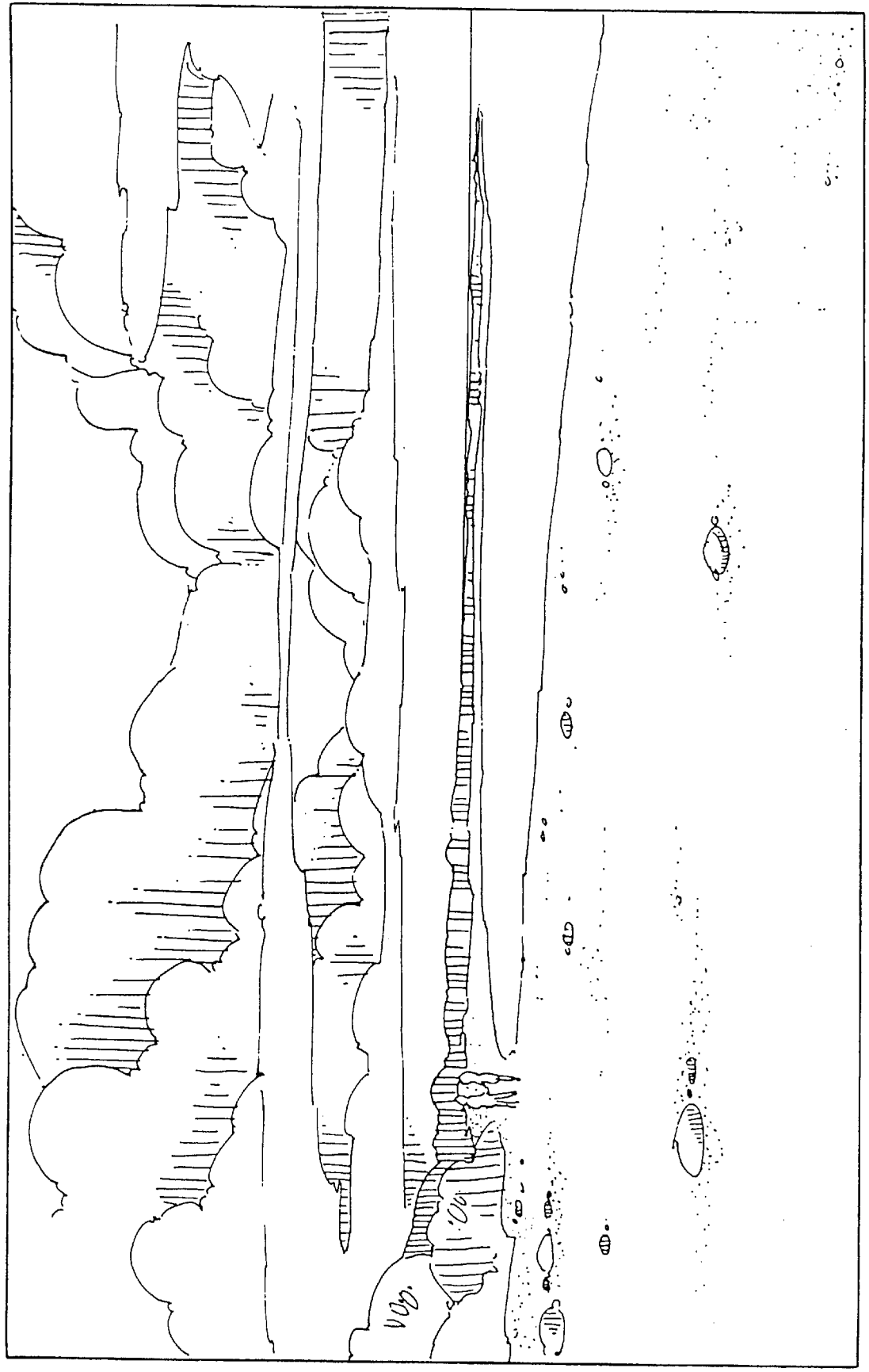
FIG. 3 shows a main image according to an embodiment of the invention.
Figure 4:
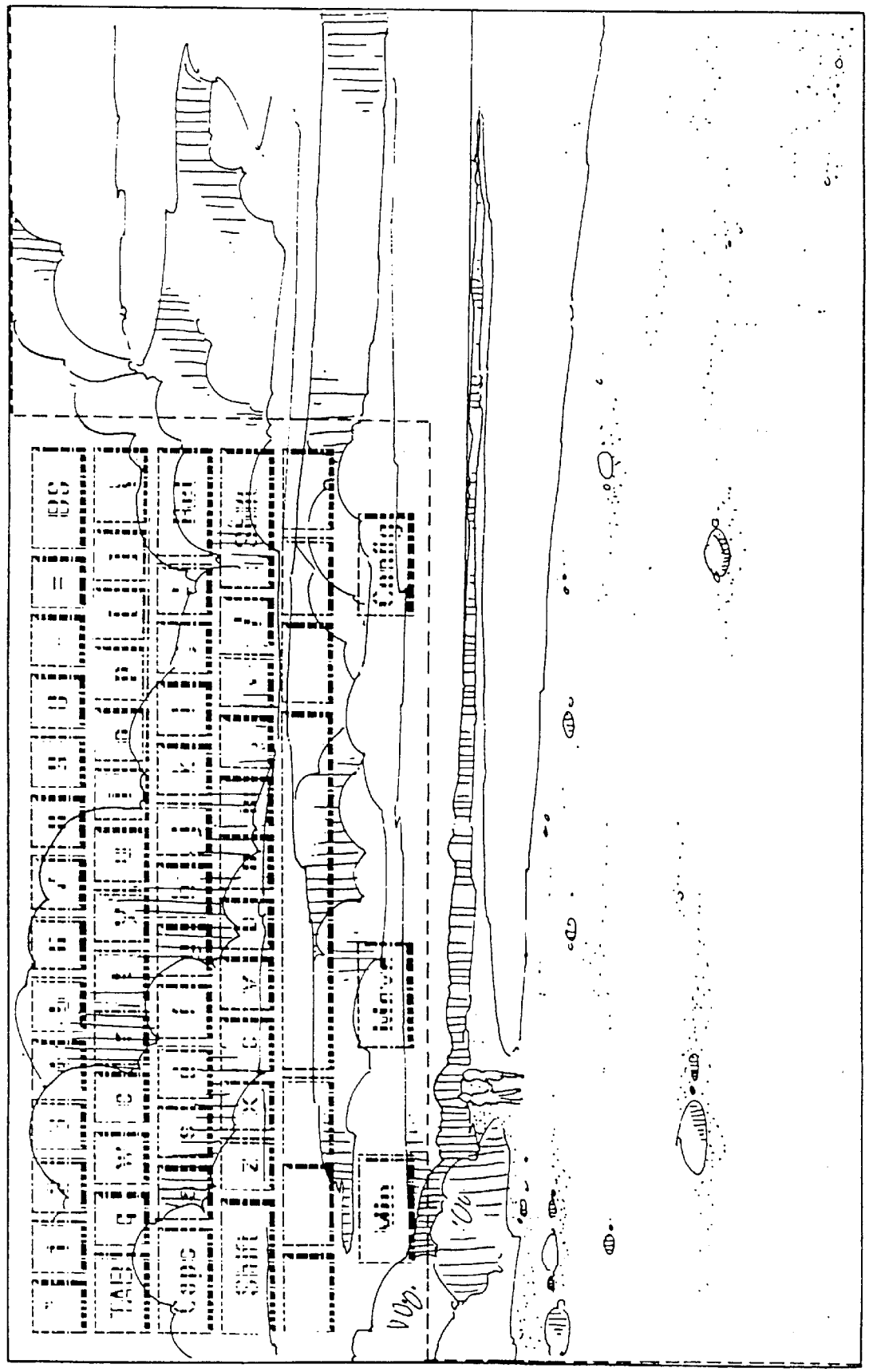
FIG. 4 shows a composite image according to an embodiment of the invention.
Figure 5:
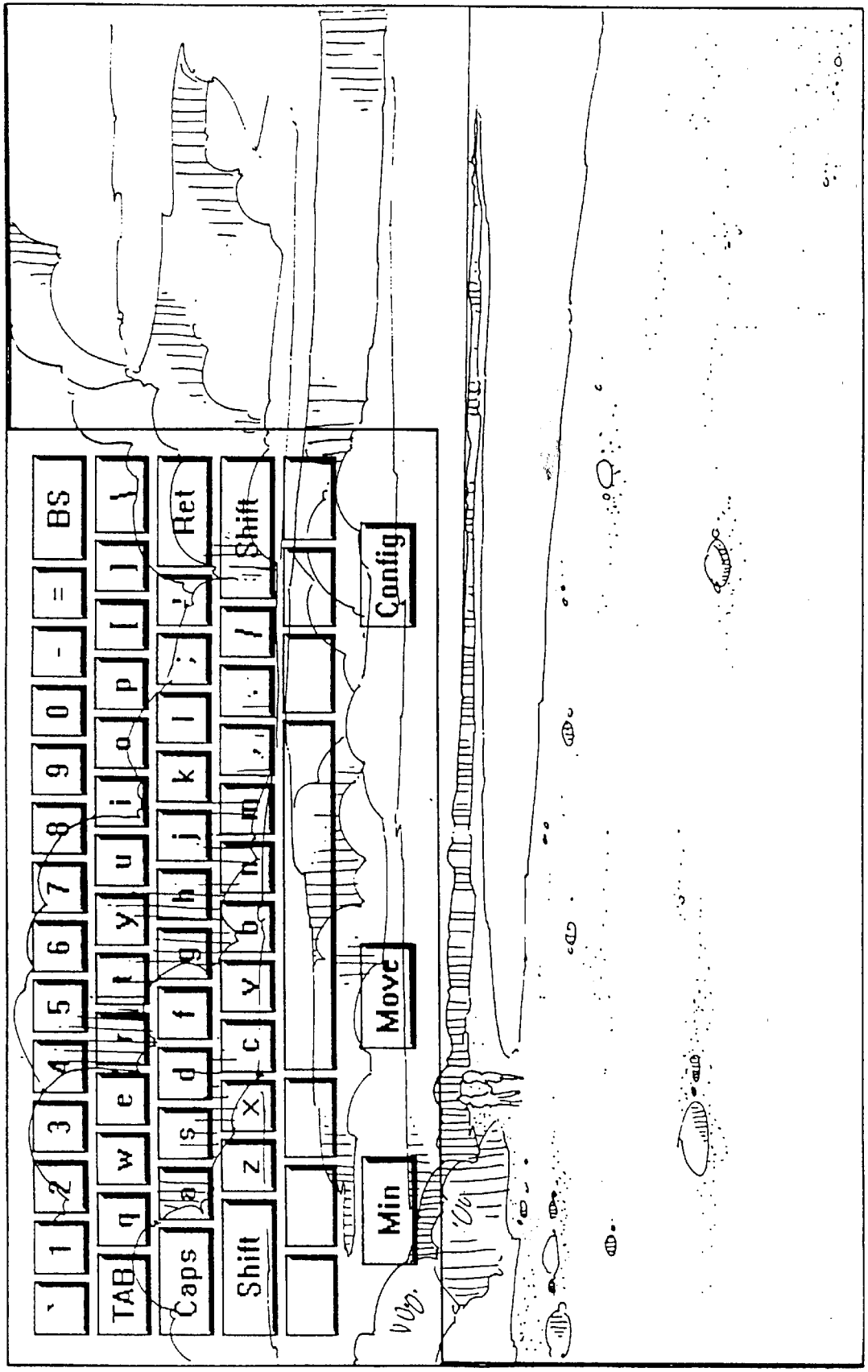
FIG. 5 shows a second composite image according to an embodiment of the invention.

FIGS. 2–5 illustrate sample images and composite screens according to embodiments of the invention. FIG. 2 illustrates a representation of at least one key—in this example a full QWERTY keyboard with several function/option keys/buttons. FIG. 3 illustrates a main image generated by a computing device. FIG. 3 should also be interpreted to cover the situation where the main image is an output image or images of an application or applications being executed by a processor or other element of the computing device. FIG. 4 shows a composite image formed in accordance with Example 1 above, and FIG. 5 shows a composite image formed in accordance with Example 2 above.

Figure 6:
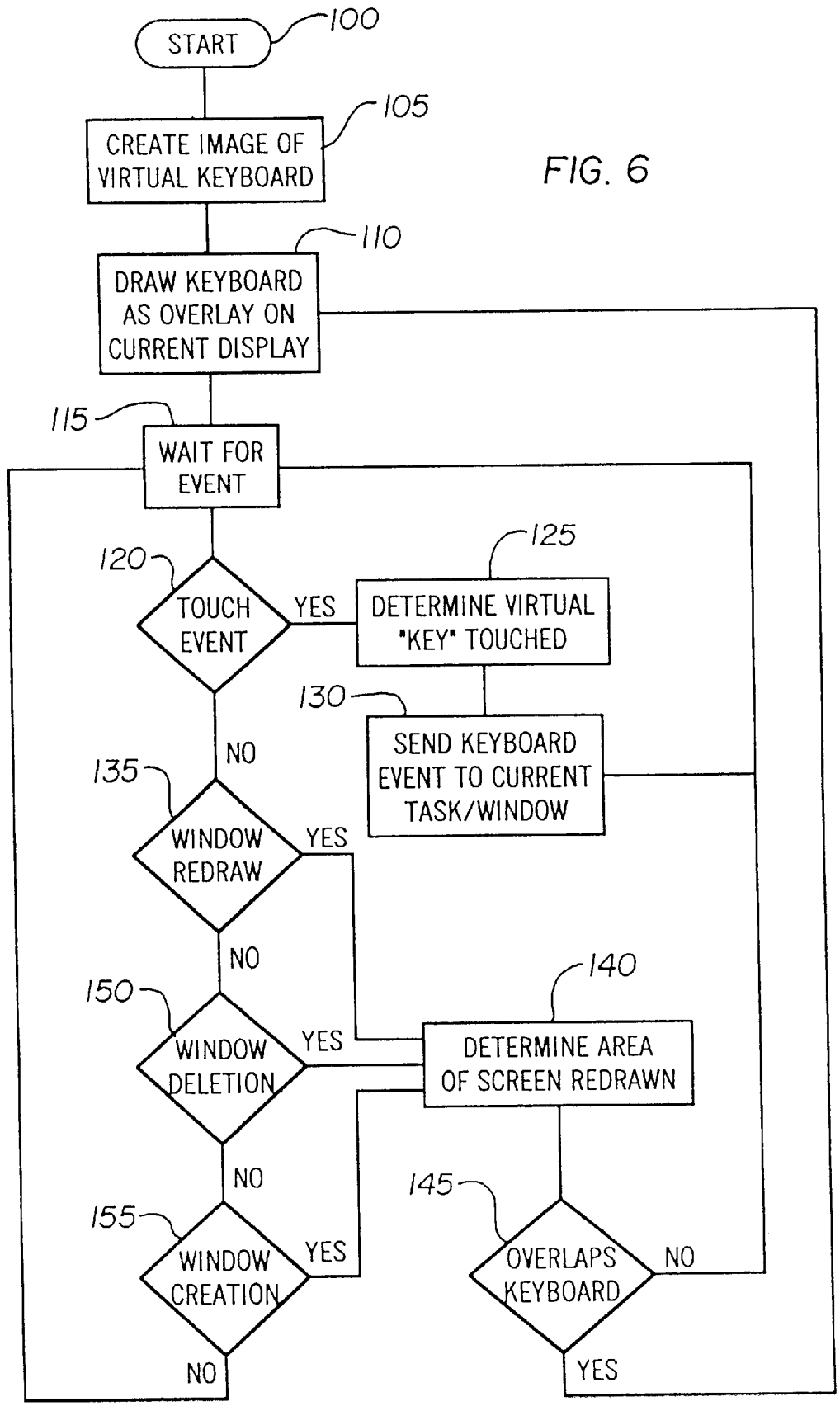
FIG. 6 is a flow chart showing operational steps according to an embodiment of the invention.

FIG. 6 illustrates a flow chart according to an embodiment of the invention, identifying the generalized processing that occurs to allow a virtual keyboard to be overlayed upon a normal display. This processing maintains consistency of the virtual keyboard image with the rest of the information being displayed.

After start step 100, a virtual keyboard image is created, at step 105. The keyboard is drawn as an overlay on the current display in step 110, and then an event is awaited at step 115. When a touch event occurs at step 120, the virtual key touched is determined at step 125 and the keyboard event is sent to the current task/window at step 130. The next event is then awaited at step 115.

If there is no touch event at step 120, it is determined whether a pertinent window has been redrawn, at step 135. If so, the area of screen redrawn is determined at step 140, and then it is determined at step 145 whether the area of screen redrawn overlaps the keyboard image. If not, the next event is simply awaited at step 115. If so, the keyboard is (re)drawn as an overlay on the current display at step 110. It is also determined whether a window is deleted at step 150, and whether a window is created, at step 155. If the answer is yes, steps 140, 145 and 110 or 115 occur as described above. If the answer is no, the next event is (still) awaited at step 115.

Mode-switching

According to one embodiment, if a representation of a key or button is held "down" for a set time, for example one second, a cursor appears at the point of the depressed key and the remainder of the keyboard (optionally) disappears. By dragging a finger along the touch screen, the user can move the cursor to a desired location. According to one embodiment, upon entering the cursor mode a number of new keys/buttons (or representations thereof, as above) appear on a side of the screen, for example, cut, paste, copy, delete and/or hold buttons. An appropriately placed mouse button is also contemplated on the screen, e.g. in a corner of the screen, to be accessed by a user's thumb. A convenient holding mechanism for the screen, allowing easy access by the user's thumb, is described below.

In use, a user types on the keyboard overlay for a desired time, and then holds one finger down for a set period of time to exit the keyboard mode and enter the cursor mode. Selected text can be highlighted using the above-described mouse button in e.g. a corner or on a side of the touch screen, and then the cursor can be dragged to hover over a cut button or other desired button. Movement of the user's finger becomes equivalent to movement of the mouse when the finger is held down, and the touch button for the mouse is in the corner of the screen so that it is accessible by the thumb. Upon exiting the cursor mode, the user's fingers are again used for typing.

Reduced-key embodiments

Figure 7:
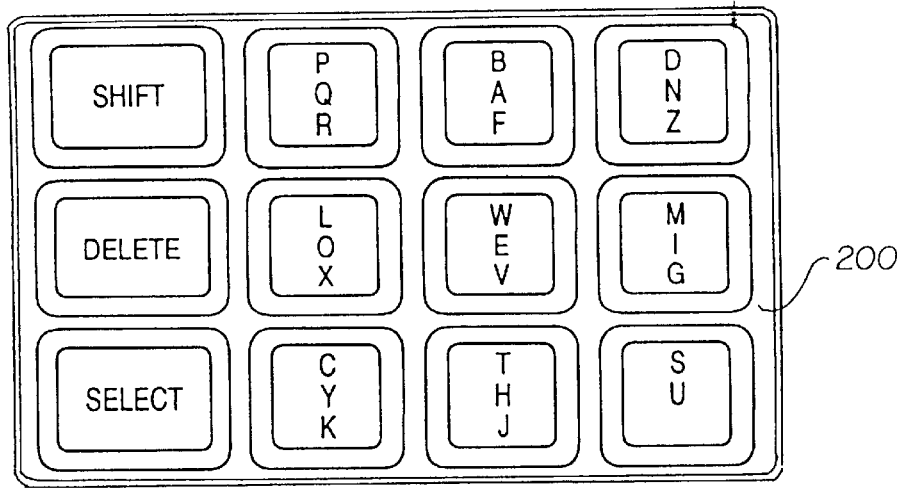
FIG. 7 shows a reduced-key keyboard.

According to one keyboard overlay embodiment, the number of keys of a virtual QWERTY keyboard is reduced to e.g. twelve, nine of which are letter keys and the other three of which are shift, delete and select keys, for example. Note FIG. 7, showing one type of reduced-key keyboard 200. Each letter key represents multiple letters, for example three letters or letter combinations. A word-recognition program discerns the word intended to be typed by hitting the letter keys, e.g. upon depressing the select (or space) keys. Reduced-key keyboard patterns enhance miniaturization achievable according to the invention and provide other advantages.

Figure 8:
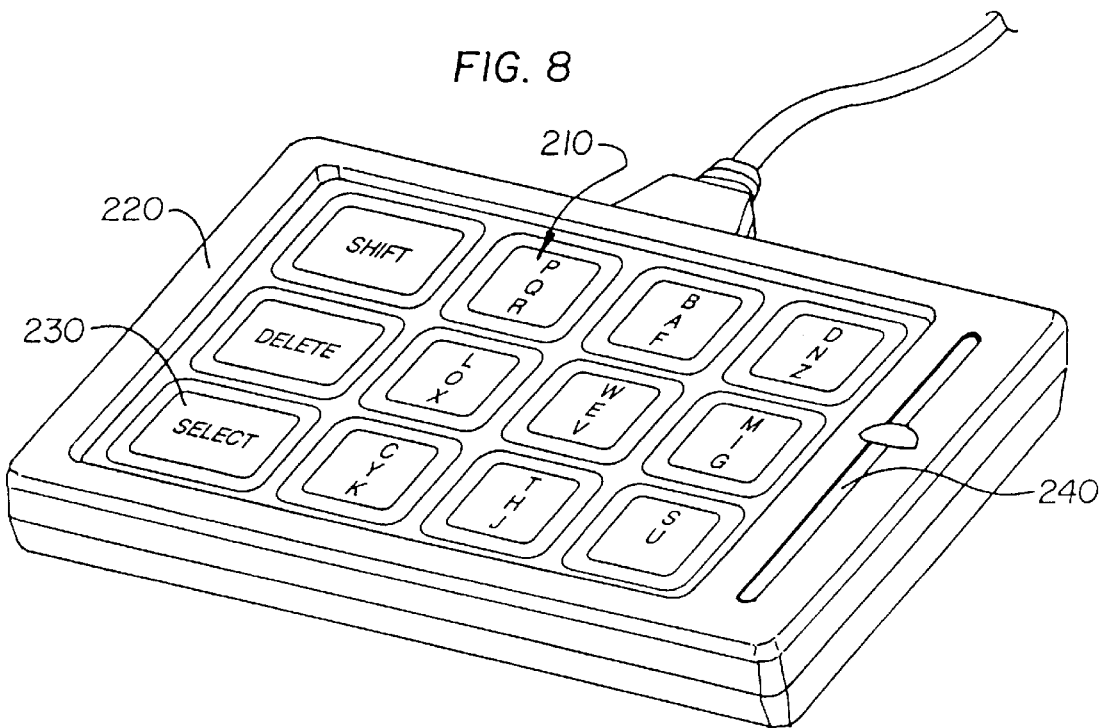
FIG. 8 shows a touch screen according to an embodiment of the invention.

According to one embodiment of the invention, a reduced-key keyboard is incorporated as a virtual or physical touch layout 210 on a standard touch screen/slidepad mouse 220, as shown in FIG. 8. A program monitors the touch screen 220 continually, detecting when a virtual option button 230 or physical option button 240 is selected to change the mode of operation from a standard touchpad mouse ("relative" mode) to a keyboard-input touchpad ("absolute" mode). Upon entering the keyboard mode, a key pattern overlay (e.g. a letter keyboard, number pad, and/or individual keys) according to the invention appears on the touchscreen directly and/or on an associated screen. It is then detected which key of the keyboard the finger of the user is tapping on to generate letter/word or other input. Using a reduced-key keyboard in connection with a standard touchpad mouse, with mode-switching as described above, provides significant display-miniaturization and key-enlargement advantages, as well as other advantages such as an increase in one-finger typing speed.

According to another embodiment, the virtual or physical select or other buttons 230, 240, or another area on the touch screen itself, can be depressed multiple times, or held down for a longer period of time, to enter and/or exit various submodes of operation. The first touch can cause a change from a relative mode to an absolute mode, and subsequent touches to absolute submodes such as alphabet, numeric, punctuation and/or other sub-modes. For example, if a user desires to input e.g. punctuation while in a standard relative mouse mode, the user taps the appropriate button or buttons twice, first to enter the absolute mode and then to enter the punctuation input sub-mode, enters the appropriate punctuation, and then taps the button or buttons twice again to return to an absolute keypad mode. One or a plurality of buttons can be used to switch between relative and absolute modes, and, within e.g. the absolute mode, to choose a keyboard, number pad, punctuation input sub-mode or other option.

It is also known in the art to reduce the size of a full keyboard, with alphabetic, numeric and function sub-keyboards, by superimposing the keys of the sub-keyboards on top of each other. According to one example, the alphabetic sub-keyboard is superimposed on the numeric and function sub-keyboards. For numeric input, the numbers are printed not at the top of each key but where multiple adjacent letter keys meet, at the interstices between the keys. Four "quarter" keys thus operate together to register the desired number, but each virtual number key is full-sized. Beneath the four letter keys associated with each number are sensing areas, i.e. points or elements or regions, with activation of a sufficient number of sensing areas by the user's finger registering the desired number. This technology reduces the overall size of the keyboard, for example to credit-card size. Examples of these types of key layouts are shown in U.S. Pat. No. 5,612,690, among others. U.S. Pat. No. 5,612,690 is incorporated herein by reference.

Superimposing the keys of various sub-keyboards on top of each other, such as an alphabetic sub-keyboard superimposed on a numeric and/or function sub-keyboard, can be combined with the reduced-key concepts disclosed above with respect to FIGS. 7–8, to further reduce the size of a keyboard or keyboard overlay according to the invention. With the layout of the FIG. 7 embodiment, for example, number and/or function keys would be placed at the physical or virtual "interstices" between the three-letter keys shown. The resulting composite image would then be superimposed over an application output in a manner described previously, for example.

Zoom embodiments

According to other embodiments, zoom-up/zoom-down capabilities are incorporated through a touch screen or other touch-sensitive input device, for example in a manner compatible with the above-described technologies. Once an appropriate zoom mode is activated, e.g. by virtual or physical keys, contact of one, two, three or more of a user's fingers with the touch-sensitive surface causes activation of an appropriate number of sensing areas and/or "zones" thereon to control screen size and/or the amount of magnification displayed. According to one example embodiment, one-finger contact causes normal screen size and/or magnification, two-finger contact causes a zoom-up to double size/magnification, three-finger contact causes triple size/magnification, and so on. Zoom-down capabilities function can be configured similarly. Sequential step-up or step-down is not required; for example triple-size/magnification can be reduced to normal size/magnification merely with the touch of one finger, without entering a double-size/magnification mode.

Thus, the user is spared the burden of going to a file menu, pulling down to the zoom feature and then selecting zoom-in and zoom-out functions using e.g. the mouse. A virtual, physical, or voice-activated zoom function select button is activated, and, simultaneously or thereafter, the touchscreen/slidepad itself determines how much of the touchscreen is covered at any one time by the user's fingers (or other pointing device), providing a specific screen size/magnification related to the number of fingers being used. According to a more specific embodiment, appropriate zoom functionality occurs based on the number of sensing areas or contact zones activated on the touch-sensitive input device. A particular area of a screen chosen can "zoom up" at the user as that area is touched.

These features have special relevance to portable, wearable computing, in which miniaturized screens are used, for example on the wrist, and generally are not full-sized. To use existing software, a user may want to see screen features in larger, zoomed-in format at certain times and, at other times, in a zoomed-out format in reference to how items look on an overall page. Flip and rotate commands, either voice-based or touch-based, can also be implemented to improve/augment the user's view of the displayed information.

Other hardware embodiments

Figure 9:
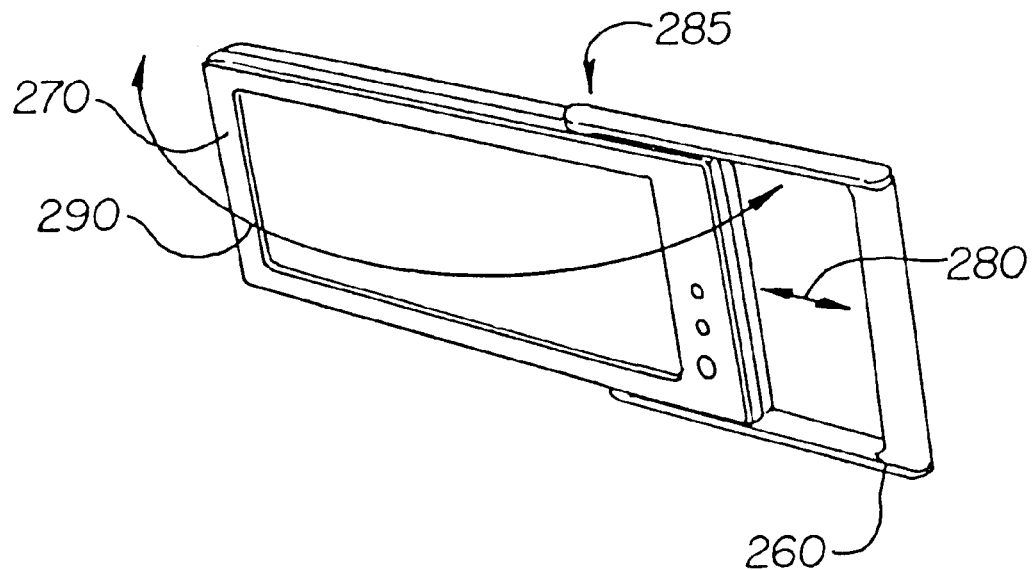
Figure 10:
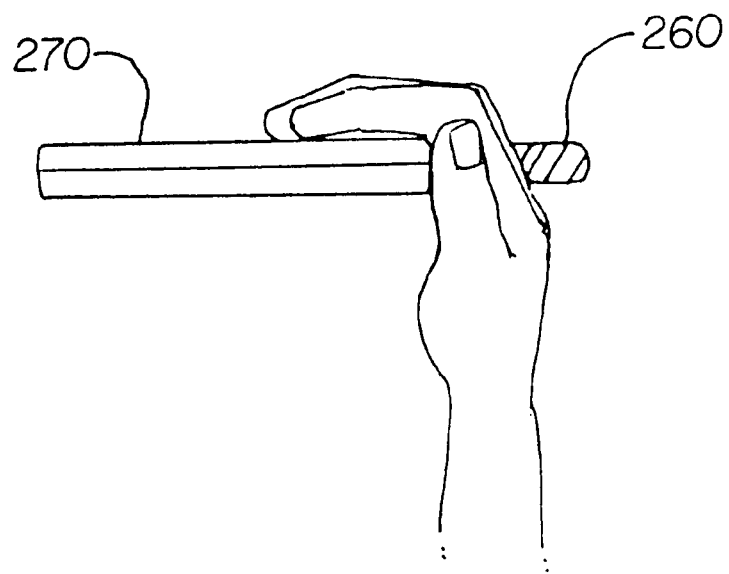

One problem with prior touch screens is that for miniature computers and miniature screens, the user's hand is often bigger than the screen itself. According to the embodiments of the invention, therefore, retractable handle 260 (FIGS. 9–10) slides relative to touch screen 270 between extended and retracted positions, as shown at 280, to provide a convenient holding mechanism at either the left or right side of touch screen 270. To shift handle 260 from the left side to the right side, or vice versa, pivot 285 is provided to swing the handle over the touch screen, as shown at 290. In the retracted position, the handle catches on the back side of the touch screen, permitting the pivoting motion. Upon traveling to or remaining in an extended position, a ball or similar projection snaps into a lateral groove or equivalent mechanism to prevent pivoting. Thus, embodiments of the invention are significantly advantageous for use by both left-handed and right-handed individuals, as shown in FIG. 10, as well as those who need to use alternative hands for different tasks. Handle 260 can also be used as a carrying handle (FIG. 11), as part of a necklace embodiment (FIG. 12), or in a wristband embodiment (FIG. 13) using e.g. a VELCRO strap. Additionally, according to another embodiment, a double-sided touch screen is provided, with the capability of flipping the screen by voice or by touch to accommodate left-handed or right-handed gripping of the touch screen by the handle without pivoting the handle from one side to the other. Multiple screen bleedthroughs, e.g. from one screen to another, on multiple screens, are also contemplated. A person with a folding screen or two displays can have them on more than one screen.

As indicated earlier, embodiments of the invention have application in voice-recognition and/or hands-free embodiments. A microphone/speaker can be built in the face of the touch-sensitive input device, permitting a user to look at and talk to the device without having a separate microphone/speaker. Voice commands can be used to change turn keyboard overlays and/or voice-input modes on and off, and to change contrast, keyboard representation types, keyboard/cursor modes, etc. Voice commands also can be used to activate the touch screen itself, so that it doesn't turn on by e.g. being depressed in a user's pocket, for example.

Other features

Sound and flashing can also be used in connection with an area to highlight where and when a user has touched the input device. Merging program use can be incorporated to highlight certain program outputs that are active and/or de-emphasize those that are inactive, for example by using a 25% pixel ratio for de-emphasis. As a user switches from one active program to another, their bleed-through intensities can shift and change accordingly. Multiprocessing be incorporated, wherein separate screens are run by separate processors, one for each screen. Keyboards can be moved, and percentage areas changed, by dragging. Although preferred embodiments have been described with respect to two images, any number of images can be combined/blended according to embodiments of the invention as long as their visual distinctions are preserved to the user's eye.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A screen peripheral system, comprising:

a computing device for providing a main image; and a touch-activated input device for generating and displaying a composite image visible to a user of the screen peripheral system, the touch-activated input device comprising a plurality of pixels, the composite image simultaneously including:

a representation of at least one key, the representation of at least one key activating an input function; and the main image provided by the computing device, the representation of at least one key being laid over the main image;

wherein the screen peripheral system implements variable-pixel control to form the representation of at least one key and to form the main image, the variable-pixel control causing pixels selected to form the representation of at least one key in the composite image to depend on and be activated simultaneously with pixels selected to form the main image, such that the main image and the representation of at least one key are displayed simultaneously to form the composite image;

further wherein the variable-pixel control includes logical operators to provide different blending/merging effects such that individual pixels of the touch-activated input device can be dedicated simultaneously to both the main image and the representation of at least one key.

2. The screen peripheral system of claim 1, wherein the variable-pixel control provides contrast adjustment between the representation of at least one key and the main image produced by the computing device.

3. The screen peripheral system of claim 2, wherein the contrast adjustment includes changing at least one of the thickness, brightness, and dotted-ness of the representation of at least one key.

4. The screen peripheral system of claim 1, wherein the representation of at least one key is a dotted-line representation.

5. The screen peripheral system of claim 1, wherein the representation of at least one key includes a representation of a full keyboard.

6. The screen peripheral system of claim 1, wherein the touch-activated input device operates in two modes, the first mode being a keyboard mode in which a user activates input functions by intermittently touching the input device, and the second mode being a cursor mode in which the user moves a cursor associated with the touch-activated input device, the second mode being entered from the first mode and/or the first mode being entered from the second by continuously touching the input device for a set time.

7. The screen peripheral system of claim 1, wherein the computing device forms the composite image by merging the representation of at least one key with the main image.

8. The screen peripheral system of claim 7, wherein the computing device merges the representation of at least one key with the main image by using a bit-block-type transfer operation.

9. The screen peripheral system of claim 8, wherein the bit-block-type transfer operation performs logical combinations of three sets of pixels:

(a) the pixels of the main image;

(b) the pixels of the representation of at least one key; and (c) optionally, an image mask for controlling which pixels of the main image will be merged with which pixels of the representation of at least one key.

10. The screen peripheral system of claim 1, wherein each pixel of the touch-activated input device is contributed 100% by either the pixels of the main image or the pixels of the representation of the at least one key to form the composite image.

11. The screen peripheral system of claim 1:
wherein the computing device eliminates X% of the pixels of a full representation of at least one key, X% representing that portion of the keyboard that is not to be seen in the composite image;
further wherein the computing device eliminates (100-X)% of the pixels of a full main image, (100-X)% representing that portion of the main image that is not to be seen in the composite image;
further wherein the computing device merges the pixel-eliminated key representation with the pixel-eliminated main image to form the composite image.

12. The screen peripheral system of claim 1, wherein the composite image includes a blended shadow of the representation of at least one key and the main image, or a clear space around a blended area to highlight the area of blending.

13. The screen peripheral system of claim 12, wherein the computing device controls the lightness/darkness of the blended shadow by controlling the blending of pixels of the at least one key representation and the main image.

14. The screen peripheral system of claim 1, wherein the computing device executes a software application, the main image being an output image produced by the software application executed by the computing device.

15. The screen peripheral system of claim 1, wherein the touch-activated input device provides zoom-up/zoom-down capability dependent on the number of the user's fingers in contact with the touch-activated input device.

16. The screen peripheral system of claim 1, wherein the touch-activated input device allows switching between relative and absolute input modes depending on the number of times or amount of time a user contacts a selected area of the touch-activated input device.

17. The screen peripheral system of claim 1, wherein the touch-activated input device allows switching between keyboards/alphanumeric sets depending on the number of times a user contacts a selected area of the touch-activated input device.

18. A wearable computing system comprising the screen peripheral system of claim 1.

19. A method of superimposing a representation of at least one key over a main image provided by a computing device, the method comprising:
(a) using variable-pixel control to form a representation of at least one key, the representation of at least one key activating an input function, and to form the main image, the variable-pixel control causing pixels selected to form the representation of at least one key to be activated simultaneously with pixels selected to form the main image; and
(b) generating and displaying a composite image visible to a user of the screen peripheral system, the composite image simultaneously including the representation of at least one key and the main image produced by the computing device, the representation of at least one key being superimposed on the main image;
wherein the variable-pixel control allows individual pixels to be dedicated simultaneously to both the main image and the representation of at least one key.

20. The method of claim 19, wherein the step of (b) includes the step of merging the representation of at least one key with the main image.

21. The method of claim 20, wherein said merging includes using a bit-block-type transfer operation.

22. The method of claim 21, wherein (b) further includes combining three sets of pixels:
(aa) the pixels of the main image;
(bb) the pixels of the representation of at least one key; and
(cc) optionally, an image mask for controlling which pixels of the main image will be merged with which pixels of the representation of at least one key.

23. The method of claim 21, wherein (b) further includes:
(c) eliminating X% of the pixels of a full representation of at least one key, X% representing that portion of the keyboard that is not to be seen in the composite image;
(d) eliminating (100-X)% of the pixels of a full main image, (100-X)% representing that portion of the main image that is not to be seen in the composite image; and
(e) merging the pixel-eliminated key representation with the pixel-eliminated main image to form the composite image.

24. The method of claim 19, wherein the composite image includes a blended shadow of the representation of at least one key and the main image.

25. The method of claim 24, wherein (b) includes controlling the lightness/darkness of the blended shadow by controlling the blending of pixels of the at least one key representation and the main image.

26. A screen peripheral system, comprising:
means for computing, the means for computing providing a main image;
means for displaying a composite image visible to a user of the screen peripheral system, the means for displaying also being for input to the means for computing, wherein the means for displaying comprises a plurality of pixels, the composite image simultaneously including:
a representation of at least one input zone, the representation of at least one input zone activating an input function; and
the main image provided by the means for computing, the representation of at least one input zone being laid over the main image;
wherein pixels selected to form the representation of at least one input zone are activated simultaneously with pixels selected to form the main image, such that the main image and the representation of at least one input zone are displayed simultaneously to form the composite image;
further wherein individual pixels of the means for displaying can be dedicated simultaneously to both the main image and the representation of at least one input zone.

27. The system of claim 26, wherein the representation of at least one input zone comprises at least one key of a keyboard.

28. The system of claim 26, wherein the representation of at least one input zone comprises a contact zone.

29. The system of claim 26, wherein the representation of at least one input zone comprises a button.

30. The system of claim 26, wherein the means for displaying a composite image comprises a touch screen.

* * * * *

UNITED STATES PATENT AND TRADEMARK OFFICE
CERTIFICATE OF CORRECTION

PATENT NO. : 6,121,960
DATED : September 19, 2000
INVENTOR(S) : David W. Carroll et al.

Page 1 of 1

It is certified that error appears in the above-identified patent and that said Letters Patent is hereby corrected as shown below:

On the front page of the patent, in the "References Cited" section, the following U.S. Patent has been added:

--5,148,155   9/1992  Martin, et al.--

Signed and Sealed this

Twelfth Day of June, 2001

*Attest:*

*Attesting Officer*

NICHOLAS P. GODICI
*Acting Director of the United States Patent and Trademark Office*